Sept. 8, 1964 P. R. MORGAN 3,147,916

STYLUS WEAR INDICATOR

Filed Aug. 8, 1962 2 Sheets-Sheet 1

Philip Roy Morgan,
INVENTOR.

BY.

Leonard Golove

ATTORNEY.

Philip Roy Morgan,
INVENTOR.
BY.
Leonard Golove
ATTORNEY.

3,147,916
STYLUS WEAR INDICATOR

Philip Roy Morgan, 417½ 8th Place, Manhattan Beach, Calif., assignor of thirty-three and one-third percent to Murray Skoff, Culver City, and thirty-three and one-third percent to Jerome B. Alberts, Beverly Hills, Calif.
Filed Aug. 8, 1962, Ser. No. 215,728
8 Claims. (Cl. 235—91)

This invention relates to a phonograph stylus wear indicator and more particularly to a turntable rotation counter or elapsed time indicating device adapted for use with a phonograph turntable or other rotating element.

Phonographs and other sound reproducing devices frequently employ as a pickup element, a stylus or needle. In the course of use, such styli even though tipped with sapphire, diamond or other precious stone having a relatively high hardness and resistance to wear, do nevertheless exhibit such wear. As is well known, the use of a pickup stylus which is appreciably worn usually results in damage to the phonograph record or dictating disk or cylinder with correspondingly poor sound reproduction. It is thus necessary, in order to protect phonograph records, that the user of the stylus frequently inspect his stylus to be sure that it is not worn and that it does not present a danger to the phonograph records. Since a relatively high power microscope, as well as some expertise, is required for the examination of pickup styli it is frequently extremely inconvenient or even impossible to make such inspections as required. However, the manufacturers of various styli determine normally expected lives of these instruments, which expectations are furnished to the purchaser thereof. As an example, a relatively good quality diamond stylus is generally rated at approximately 500 hours of operating life, when used with phonograph records rotating at 33⅓ revolutions per minute.

Since it is obviously inconvenient for the normal user of a phonograph to maintain an accurate record of the elapsed time during which his stylus has been in use, various attempts have been made to provide a turntable revolution counter or elapsed time indicator which will provide the information needed to adequately protect phonograph records. One such device is a conventional clock type elapsed time indicator and comprises a synchronous motor which is connected to the same source of power as the turntable motor and which indicates the number of hours during which power is applied to the turntable motor.

This device suffers from several disadvantages. It is relatively large, complicated and expensive to manufacture and does not directly measure the variable which is proportional to the wear on the stylus. The true wear factor or variable is the number of rotations of the turntable rather than the number of hours during which power is supplied to the turntable. Thus, while the elapsed time would be an adequate measure should the turntable always turn at the same rotational speed, most conventionally manufactured turntables are adapted for use at multiple speeds of rotation, typically 33⅓, 45, and 78 revolutions per minute. It is evident that, in addition to the duration of power application to the turntable, wear on the pickup stylus will also depend upon the rotational speed of the turntable. Thus an elapsed time indicator does not give a true and accurate measurement of the wear on a stylus under the normally prevailing conditions of use. The present invention provides a revolution counter which operates directly from the turntable of a phonograph and which counts the revolutions thereof, providing an accurate reading of the wear on a stylus used with the turntable.

It is therefore an object of the present invention to provide a novel and improved indicator of the amount of wear on a phonograph stylus which gives an accurate indication of such wear regardless of the speed of rotation of the phonograph turntable.

Another object of the present invention is to provide a stylus wear indicator which is relatively simple and inexpensive to manufacture.

Still another object of the present invention is to provide a stylus wear indicator which measures the number of revolutions of the phonograph turntable without interfering with or altering the rotation of said turntable.

A further object of the present invention is to provide a stylus wear indicator which may be used with already existing phonograph equipments and which may readily, quickly and easily be installed in position to be used therewith.

Briefly described, the present invention comprises a permanent magnet or other actuating element mounted on or otherwise mechanically coupled to the side of phonograph turntable, and a counting unit including a plurality of gears which is magnetically coupled or otherwise adapted to be operated by the actuating means.

The novel features which are believed to be characteristic of the present invention, both as to its organization and the method of operation, together with further objects and advantages thereof, will be better understood from the following description considered in connection with the accompanying drawings, in which an embodiment of the invention is illustrated by way of example. It is to be expressly understood, however, that the drawings are for the purpose of illustration and description only, and are not intended as a definition of the limits of the invention.

Figure 1:
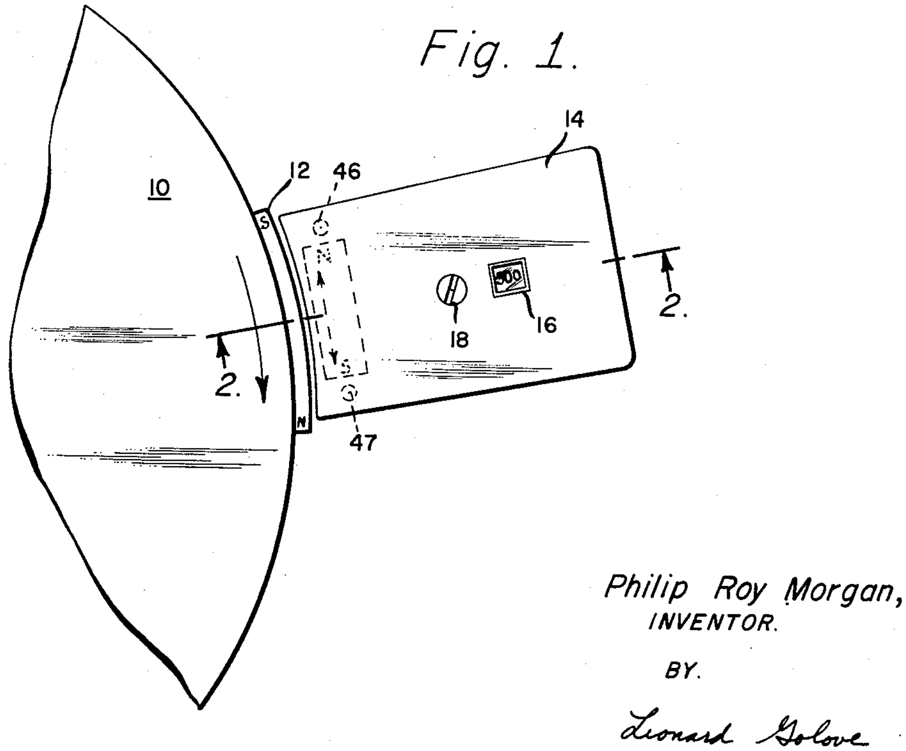
FIG. 1 is a plan view of the present invention showing the invention installed on a phonograph.
Figure 3:
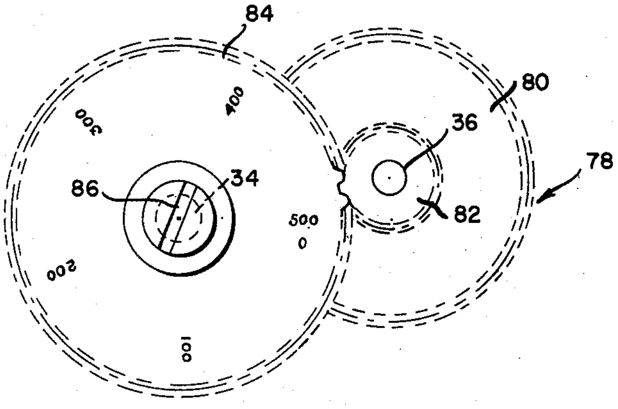
FIG. 3 is a diagrammatic view of a first portion of the gearing sequence.
Figure 4:
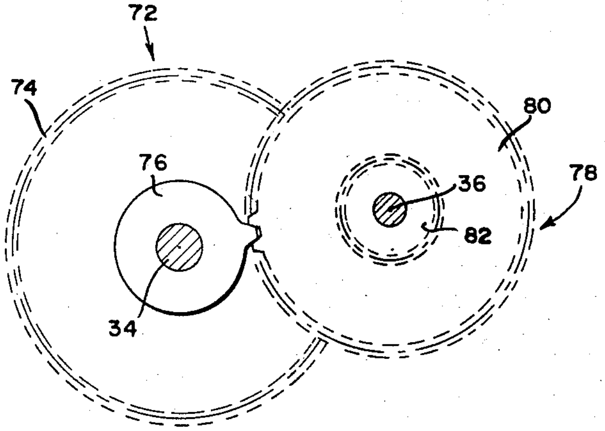
FIG. 4 is a diagrammatic view of a second portion of the gearing sequence.

Turning now to FIG. 1, the stylus wear indicator which is the subject of the present invention, is shown mounted in position adjacent a portion of a phonograph turntable 10. The stylus wear indicator comprises two portions, an actuating element 12, adapted to be mounted on the side of the turntable and to rotate with the turntable, and a counting unit 14 placed adjacent the actuating element 12 and spaced from the actuating element by as small a separation as is feasible under the circumstances. The actuating element 12 is composed of a material exhibiting a relatively high magnetic remanence, such as Alnico or other similar material, and is provided with a curvature which corresponds to the curvature of the edge of the turntable 10. The actuating element 12 may be either magnetically polarized circumferentially or radially with respect to the turntable. If the actuating element 12 is polarized circumferentially, a north pole will be provided at one end of the element 12 and a south pole at the opposite end. If the actuating element 12 is polarized radially, each end of the actuating element 12 will be polarized in an opposite sense. In either case, the outer surface of the actuating element 12, that is the surface toward the counting unit 14, must have a north magnetic pole at one end and a south magnetic pole at the other end.

Figure 2:
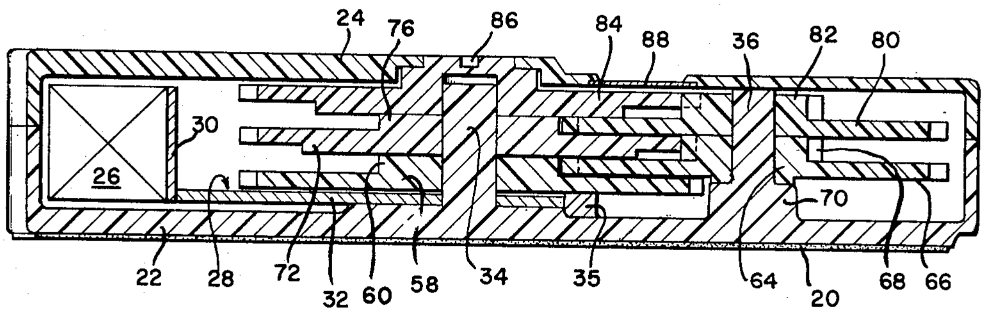
FIG. 2 is an elevational view in cross-section of the counter unit of the present invention taken along the line 2—2 of FIG. 1.

The surface of the counting unit 14 which lies adjacent the outer surface of the actuating element 12 is also provided with a curvature which is substantially equal to the curvature of the outer surface of the actuating element 12. The inner surface of the actuating element 12 is provided with an adhesive layer so that the actuating element 12 will remain mounted in a fixed position on the side of the turntable 10. The lower surface of the counting unit 14 is also provided with an adhesive layer (numeral 20 in FIG. 2) so that the counting unit 14 may be mounted firmly on supporting structure which is normally found adjacent a phonograph turntable.

The desired separation between the actuating element 12 and the counting unit 14 is achieved by providing an adhesive paper covering over either the outer surface of the actuating element 12 or the adjacent surface of the counting unit 14. The following steps are necessary in order to properly mount the wear indicator for operation. First, the actuating element 12 is mounted by being pressed into position on the side of turntable 10. Next the counting unit 14 is pressed into position adjacent the actuating element 12 such that contact is made between the adhesive paper layer described above and the exposed curved surface. The turntable is then rotated so that the adhesive paper may be removed. Thus a separation of the outer surface of the actuating element 12 and the adjacent surface of the counting unit 14 has been achieved which is equal to the thickness of the adhesive paper layer.

The counting unit 14 is further provided with a window 16 through which numerals indicative of the amount of wear on the stylus may be seen and with resetting screw 18, which is used to reset the counting unit to its zero position, as will be described in detail below.

Turning now to FIGS. 2, 3, 4 and 5, there are shown the details of construction of the counting unit 14. The supporting structure and protective covering for the counting mechanism comprises a lower housing 22 and an upper housing 24. After the counting mechanism has been assembled in the lower housing 22, the upper housing 24 is cemented into position adjacent the lower housing 22 as shown. The counting unit may be considered as comprising two principal functional portions; actuating means responsive to the actuating element 12, and a gear train coupled to the actuating means, which provides an angular rotation which is proportional to the number of revolutions of the turntable 10. A permanent magnet 26 which may be rectangular in cross-section, and which is composed of a material exhibiting a relatively high magnetic remanence is mounted at that portion of the counting unit which is adjacent the actuating element 12. The magnet 26 is cemented to or otherwise mounted against a movable bracket 28, having a vertical portion 30 and a horizontal portion 32. The magnet 26 is attached to the outer face of the vertical portion 30 and may be polarized radially or circumferentially as described in connection with the magnet 12. The horizontal portion 32 of the bracket is rectangular in shape has a rectangular flange extending therefrom at that end of the horizontal portion 32 which is adjacent the magnet 26. The horizontal portion 32 has a hole journalled therethrough relatively near that end of the horizontal portion 32 which is removed from the magnet 26.

The lower housing 22 is provided with a pair of spindles or shafts 34 and 36 which may form an integral portion of the housing 22 as shown. The hole in the horizontal portion 32 of the bracket 28 is adapted to fit over the shaft 34 so that the bracket 28 may rotate with respect to the shaft 34. A shoulder 35 is provided at the base of the shaft 34 so that only a relatively small portion of the bracket 28 contacts the lower housing 22 providing freer movement of the bracket 28 and of the magnet 26 attached thereto.

The rectangular flange forming a part of the horizontal portion 32 of the bracket 28 is provided with a rivet 38 which is mounted vertically relatively near one end of the flange. A pawl having a hole journalled therethrough is rotatably mounted on the rivet 38 and is engaged by a spring 42 which also engages the vertical portion 30 of the bracket 28, and which tends to force the pawl 40 into a position away from the vertical portion 30. The head 44 of the rivet 38 maintains the pawl 40 and the spring 42 in position on the rivet 38. That portion of the pawl 40 which is furthest from the vertical portion 30 of the bracket 28 has the shape of a ratchet tooth as will be described hereinafter. The bracket 28 is limited in its movement by a pair of stops 46 and 47, which may be mounted on the lower housing 22.

A second pawl 48 which is fixed with respect to the movable bracket 28, is rotatably mounted on a shaft or pin 50, which may form an integral portion of, or be affixed in, the lower housing 22. The pawl 48 is engaged by a spring 52 which also engages a pin or shaft 54 which may form a part of or be inserted into the lower housing 22. A retainer 56 maintains the position of the pawl 48 and the spring 52. The pawl 48 is identical in shape to the pawl 40.

Rotatably mounted on the shaft 34 immediately above the movable bracket 28 is a ratchet gear 58. Both the pawls 40 and 48 are adapted to engage the ratchet gear 58 at different portions of its circumference. The springs 42 and 52 tended to urge the ratchet tooth portion of the pawls 40 and 48 respectively into engagement with the ratchet portion of the ratchet gear 58.

The ratchet gear 58 has an upper portion 60 forming an integral part therewith or attached immovably thereto, which portion 60 is concentric with the ratchet gear 58. The portion 60 is provided with a single gear tooth 62 located at one point on the circumference of the gear portion 60. Both the ratchet gear 58 and the gear portion 60 are provided with a hole journalled axially therethrough and are adapted to be rotatably mounted on the shaft 34. A gear 64 comprising two portions, as was described above in connection with the gear 58, has a hole journalled axially therethrough and is rotatably mounted on the shaft 36. The lower portion 66 of the gear 64 has the larger diameter and must engage with the one tooth gear portion 62. The upper portion 68 of the gear 64 having the smaller diameter is adapted to engage with a gear as will be described hereinafter. The gear 64 is maintained at the necessary height for proper engagement by a shoulder 70 forming a part of the shaft 36.

Engaging with the gear 64 is a gear 72, which is axially mounted for rotation on the shaft 34. The gear 72 is provided with a lower portion 74 having a relatively large diameter which engages with the upper portion 68 of the gear 64. An upper portion 76 of the gear 72 having a relatively small diameter is provided with a single gear tooth. The gear 72 is adapted to engage with a gear 78, which is concentrically and rotatably mounted on the shaft 36. The gear 78 has a lower portion 80 having a relatively large diameter which engages with the one tooth gear portion 76. The gear 78 is also provided with an upper portion 82 having a relatively small diameter which is adapted to engage with a gear 84. The gear 84 is provided with a radial and concentric hole journalled therein, and is adapted to engage with the gear portion 82. The upper surface of the gear 84 is provided with indicia of the angular rotation of the gear 84. The upper surface of the gear 84 is also provided with a screwdriver slot 86 which is accessible through a hole in the upper housing 24. The slot 86 may be turned with a screwdriver or other instrument to reset the rotation counter to the zero position.

The indicia provided on the upper surface of the gear 84 are made visible to the user of the stylus wear indicator through a window 88 which comprises a hole in the upper housing 24, located at a point relatively near the circumference of the gear 84. Foreign matter may be excluded from the operating portions of the counter by providing a transparent covering for the window 88 if desired.

The upper housing 24, the lower housing 22, and all of the gears and other moving portions of the mechanism described above may be manufactured from ethyl cellulose which is a high impact plastic material. In addition to its excellent wear qualities, this material provides inexpensive and accurate parts which are extremely well suited to devices such as the present invention.

The operation of the stylus wear indicator will be described below.

As has been described above, the magnet 12 is mounted on the turntable 10 so that the magnet 12 rotates with the turntable 10. As has also been described, the magnet 26 is placed such that during the rotation of the magnet 12 each of the magnets 12 and 26 will lie within the effective magnetic field of the other magnet. Regardless of whether the magnets 12 and 26 are circumferentially or radially polarized, proper operation of the present invention requires that the adjacent surfaces of the magnets 12 and 26 be oppositely polarized as shown in FIG. 1. Referring further to FIG. 1 and considering the direction of rotation shown and the polarizations of the magnets 12 and 26 shown, it may be seen that as the magnet 12 first approaches the magnet 26, the north poles of each of the magnets will first come into proximity. This will cause a motion of the magnet 26 away from the oncoming north pole, due to the repulsion of similar magnetic poles, until the magnet 26 hits the stop 47. After the magnet 12 has passed the magnet 26, it may be seen that the two south poles will lie adjacent, causing a movement of the magnet 26 in a direction away from the magnet 12 and causing the magnet 26 to contact the stop 46.

Figure 5:
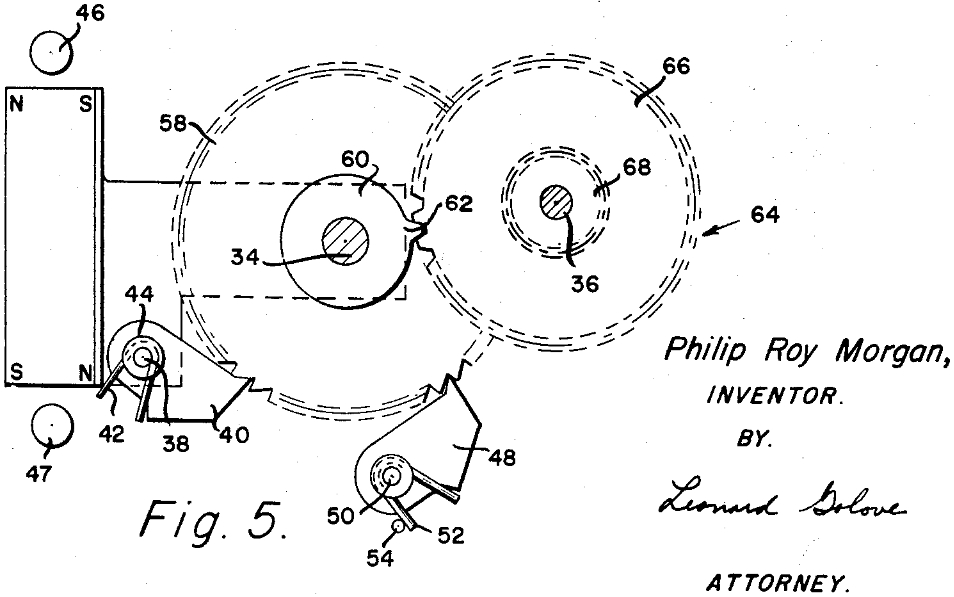
FIG. 5 is a diagrammatic view of a third portion of the gearing sequence.

As may be seen from FIG. 5, the movement of the magnet 26 also causes movement of the movable bracket 28 and of the pawl 40 mounted thereon. Movement of the magnet 26 toward the stop 47 thus produces a force exerted by the pawl 40 tending to move the ratchet gear 58 in a counterclockwise direction. This movement of the ratchet gear 58 is relatively unopposed by the pawl 48 because of the shape of the tooth portion of the pawl 48 and because of the relatively small force exerted by the spring 52 on the pawl 48. Thus the ratchet gear 58 will advance in a counterclockwise direction and the pawl 48 will override one tooth of the ratchet gear 58. When the magnet 26 moves toward the stop 46, the pawl 48 will restrain clockwise rotation of the ratchet gear 58 because of the shape of the pawl 48. However, motion of the magnet 26 toward the stop 46 will cause the pawl 40 to override one tooth of the ratchet gear 58. The springs 42 and 52 are provided to maintain pressure of the pawls 40 and 48 against the ratchet gear 58 and are not made strong enough to interfere with the rotation of the ratchet gear 58.

The ratchet gear 58 is provided with one hundred teeth around its circumference. Motion of the ratchet gear 58 produces a corresponding motion of the one tooth gear 60. Each complete rotation of the one tooth gear 60 advances the gear 66 by a single tooth. The gear 66 is provided with 20 teeth around its circumference. Rotation of the gear 66 produces a corresponding rotation of the gear 68 which is provided with five teeth around its circumference. The gear 68 engages the gear 74 which is provided with 25 teeth around its circumference. The one tooth gear 76 has a corresponding rotation to the gear 74 and engages the 20-tooth gear 80. The five-tooth gear 82 has a corresponding rotation to the gear 80 and engages the 25-tooth gear 84. There is thus one revolution of the gear 84 for each one million revolutions of the turntable 10. Since the normal diamond phonograph pickup stylus is rated at 500 hours of operation at a rotational speed of 33⅓ revolutions per minute, it may be computed that the stylus is rated at one million revolutions.

While the magnetically operated turntable rotation counter described above has the advantage that there is no physical contact between the turntable and the counter, it should be pointed out that a projecting finger could be mounted on the turntable in place of the magnet 12. In such an embodiment, the lower and upper housings 22 and 24 respectively would be opened up to permit the finger to engage the movable bracket 28.

There has thus been described a novel and improved phonograph stylus wear indicator which has all of the objects and advantages enumerated above as well as others which are now apparent.

It is therefore claimed:

1. A phonograph stylus wear indicator for use with a phonograph having a rotating turntable, said wear indicator comprising a permanently magnetized actuating magnetic element mounted on said turntable and adapted to rotate therewith, and counting means including a permanently magnitized element magnetically coupled to said actuating magnetic element and responsive to rotation of said turntable for indicating the number of rotations of said turntable.

2. A phonograph stylus wear indicator for use with a phonograph having a rotating turntable, said wear indicator comprising a permanently magnetized actuating magnetic element mounted on said turntable and adapted to rotate therewith, and counting means responsive to rotation of said turntable for indicating the number of rotations of said turntable, said counting means comprising permanently magnetized actuating magnetic means magnetically coupled to said actuating magnetic element for producing a predetermined angular displacement for each rotation of said actuating element and output means mechanically coupled to said actuating magnetic means and adapted to rotate through an angular displacement proportional to the number of rotations of said actuating magnetic element.

3. Apparatus according to claim 2 in which said actuating magnetic element and said actuating magnetic means are oppositely polarized.

4. A phonograph stylus wear indicator for use with a phonograph having a rotating turntable, said wear indicator comprising a permanently magnetized actuating element mounted on said turntable and adapted to rotate therewith, and counting means responsive to rotation of said turntable for indicating the number of rotations of said turntable, said counting means including a permanently magnetized element comprising actuating means magnetically coupled to said actuating element for producing a predetermined angular displacement for each rotation of said actuating element and output means including a gear train mechanically coupled to said actuating magnetic means and adapted to rotate through an angular displcement proportional to the number of rotations of said actuating magnetic element.

5. Apparatus according to claim 4 in which said actuating magnetic element and said actuating magnetic means are oppositely polarized.

6. Apparatus according to claim 5 in which said actuating magnetic means comprises a movable bracket having a free end portion and a fixed end portion, said bracket adapted to rotate about said fixed end portion, a permanent magnet mounted on said free end portion adjacent said actuating magnetic element at one orientation of said element, moving means mounted on said movable bracket and engaging said gear train for rotating said gear train in one direction of rotation and restraining means engaging said gear train for preventing rotation of said gear train in the opposite direction of rotation.

7. Apparatus according to claim 5 in which said actuating magnetic means comprises a movable bracket having a free end portion and a fixed end portion, said bracket adapted to rotate about said fixed end portion, a permanent magnet mounted on said free end portion adjacent said actuating magnetic element at one orientation of said element, a first pawl rotatably mounted on said movable bracket and engaging said gear train for rotating said gear train in one direction of rotation and a second pawl engaging said gear train for preventing rotation of said gear train in the opposite direction of rotation.

8. A phonograph stylus wear indicator for use with a phonograph having a rotating turntable, said wear indicator comprising: a permanently magnetized actuating element having first and second magnetic poles and adapted to be fastened to the turntable on the circumferential periphery thereof with said poles circumferentially displaced from one another in the direction of turntable rotation; and counting means including a permanently magnetized actuated element having first and second poles of magnetization, said actuated element positioned with its poles on a line substantially parallel to a line including the poles of said actuating element, said actuated element being mounted for limited lateral motion in a plane parallel to the rotational plane of the turntable, and means including ratchet and pawl elements, for translating lateral motion of said actuated element into rotational motion and gear train means mechanically coupled to said actuated element, for providing an indication of complete revolutions of the turntable.

References Cited in the file of this patent

UNITED STATES PATENTS 1,141,309 Bozic ------------------ June 1, 1915